US011367445B2

(12) United States Patent
Dixit et al.

(10) Patent No.: US 11,367,445 B2
(45) Date of Patent: Jun. 21, 2022

(54) VIRTUALIZED SPEECH IN A DISTRIBUTED NETWORK ENVIRONMENT

(71) Applicant: Citrix Systems, Inc., Fort Lauderdale, FL (US)

(72) Inventors: Pawan Kumar Dixit, Bangalore (IN); Dinesh Jidugu, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 249 days.

(21) Appl. No.: 16/782,470

(22) Filed: Feb. 5, 2020

(65) Prior Publication Data

US 2021/0241761 A1 Aug. 5, 2021

(51) Int. Cl.
| | |
|---|---|
| *G10L 15/22* | (2006.01) |
| *G06F 9/451* | (2018.01) |
| *G10L 15/30* | (2013.01) |
| *H04L 47/70* | (2022.01) |
| *H04L 67/141* | (2022.01) |
| *G10L 13/00* | (2006.01) |
| *G10L 15/26* | (2006.01) |
| *H04L 67/10* | (2022.01) |
| *H04L 67/01* | (2022.01) |

(52) U.S. Cl.
CPC .............. *G10L 15/22* (2013.01); *G06F 9/453* (2018.02); *G10L 13/00* (2013.01); *G10L 15/26* (2013.01); *G10L 15/30* (2013.01); *H04L 47/82* (2013.01); *H04L 67/141* (2013.01); *G10L 2015/223* (2013.01); *H04L 67/10* (2013.01); *H04L 67/42* (2013.01)

(58) Field of Classification Search
CPC .......... G06F 9/453; G06F 16/31; G06F 30/34; G06Q 40/08; G06Q 10/107; G10L 13/00; G10L 13/04; G10L 15/16; G10L 15/22; G10L 15/26; G10L 15/30; G10L 17/00; G10L 19/0018; G10L 2015/223; G10L 15/02; G10L 15/07; G10L 19/00; G10L 19/167; H04L 47/82; H04L 67/10; H04L 67/141; H04L 67/42; H04L 12/6418; H04M 3/42221; H04M 1/271; H04M 7/125; A01B 39/18; G11B 27/36
USPC ........ 370/352; 704/219, 220, 231, 235, 236, 704/255, 270, 270.1, 500; 705/4
See application file for complete search history.

(56) References Cited

U.S. PATENT DOCUMENTS 4,764,963 A * 8/1988 Atal ...................... G10L 19/00
704/213
5,987,405 A * 11/1999 Bantz .................. G10L 19/0018
704/220

(Continued)

*Primary Examiner* — Gerald Gauthier
(74) *Attorney, Agent, or Firm* — Banner & Witcoff, Ltd.

(57) ABSTRACT

Aspects of the disclosure relate to various systems and techniques that provide for a method and apparatus for transmitting speech as text to a remote server and converting the text stream back to speech for delivery to a remote application. For example, a person, through workspace virtualization, is accessing a remote application that accepts speech as its input. The user, using a microphone, would speak into the microphone where the speech would be converted into text with a local speech-to-text converter. The text version of speech is sent to a remote server, which converts the text back to speech using a remote server based text-to-speech converter where the reconstructed speech is usable as input to a remote application or device.

20 Claims, 12 Drawing Sheets

(56) References Cited

U.S. PATENT DOCUMENTS

| | | | | |
|---|---|---|---|---|
| 6,035,273 | A * | 3/2000 | Spies | G10L 15/07 704/235 |
| 6,041,300 | A * | 3/2000 | Ittycheriah | G10L 15/22 704/255 |
| 6,519,560 | B1 * | 2/2003 | Spicer | G10L 19/0018 704/231 |
| 6,600,737 | B1 * | 7/2003 | Lai | H04L 47/10 370/352 |
| 6,775,652 | B1 * | 8/2004 | Cox | G10L 15/02 704/236 |
| 8,447,619 | B2 * | 5/2013 | Zopf | G10L 21/00 704/500 |
| 9,690,894 | B1 * | 6/2017 | Titley | G06F 30/34 |
| 2002/0143551 | A1 * | 10/2002 | Sharma | G10L 15/30 704/270.1 |
| 2005/0249192 | A1 * | 11/2005 | Schoeneberger | H04M 7/125 370/352 |
| 2007/0088547 | A1 * | 4/2007 | Freedman | G10L 19/0018 704/235 |
| 2009/0276215 | A1 * | 11/2009 | Hager | G06F 16/31 704/235 |
| 2011/0022387 | A1 * | 1/2011 | Hager | G06Q 10/107 715/752 |
| 2011/0112832 | A1 * | 5/2011 | Prorock | G11B 27/36 704/E15.044 |
| 2012/0022865 | A1 * | 1/2012 | Milstein | G10L 15/10 704/235 |
| 2013/0317829 | A1 * | 11/2013 | Ko | G10L 19/167 704/500 |
| 2014/0052480 | A1 * | 2/2014 | Bell | G06Q 40/08 705/4 |
| 2014/0278404 | A1 * | 9/2014 | Holmes | G10L 15/26 704/235 |
| 2014/0365216 | A1 * | 12/2014 | Gruber | G10L 15/063 704/235 |
| 2020/0105256 | A1 * | 4/2020 | Fainberg | G10L 15/22 |
| 2020/0211540 | A1 * | 7/2020 | Macconnell | G10L 15/22 |
| 2021/0241761 | A1 * | 8/2021 | Dixit | G10L 15/30 |
| 2022/0034859 | A1 * | 2/2022 | Rupp | A01B 39/18 |

* cited by examiner

VIRTUALIZED SPEECH IN A DISTRIBUTED NETWORK ENVIRONMENT

FIELD

Aspects described herein generally relate to computer hardware and software. In particular, one or more aspects of the disclosure generally relate to the transmission of converted speech in an internet based environment.

BACKGROUND

An internet based environment can include access to remote meetings, the sharing of information, and access to remote applications included software as a service and other internet based applications. Such applications allow users to access various types of resources, such as desktops and applications, which are hosted on a remote server, but presented as if they were local resources. Some applications and resources integrate the use of speech recognition in their functionality. Typically, the transmission of speech involves the sampling and digitization of sound. The sampling rate and amount of data sampled will determine the quality of the digitized speech. The higher the quality of the digitized speech, the higher the amount of data that is captured, and the higher the amount of bandwidth needed to transmit the digitized speech.

SUMMARY

Accessing remote applications can introduce some delays or latencies. In many applications the delays are not readily apparent and do not fundamentally alter the performance of the application. However, in some applications, for example those involving speech recognition, minor delays can seriously impair the ability of the remote application to accurately convert the speech into text.

Aspects of the disclosure relate to various systems and techniques that provide for a method and apparatus for transmitting speech as text to a remote server and converting the text stream back to speech for delivery to a remote application. For example, a person, through web or virtualization applications, may access a remote application that accepts speech as its input. The user, would speak into a microphone connected to a local computer. The local computer would convert the analog speech signal into a data stream or file through a process of digitization. The digitized speech would be forwarded to the remote server. The remote server would accept the digitized speech, convert it back to audio and then deliver the audio speech to a speech-to-text software application, i.e., speech recognition, such as DRAGON SPEECH RECOGNITION, that could be used to generate text in a word processing application, such as MICROSOFT WORD.

However, the process of digitizing and transmitting an audio signal, such as speech, is subject to latencies and jitter due to a poor internet connection or packet loss. The introduction of latencies and jitter into the transmission of an audio stream can greatly affect the quality of the speech-to-text conversion at the remote server. Thus, one embodiment is to use a client based speech-to-text converter, i.e., a speech recognition converter, which rather than just digitizing the speech at a local client device, the speech would be converted to text at the client device. The text would then be sent to a remote server. The remote server may convert the text back into speech, for example, with a text-to-speech converter of the remote server. The server may output the speech to a word processing application, a virtual assistant, or any other speech driven application executable on the server.

At least one aspect is directed to a method that includes receiving, by a server from a client computing device, a first text data, wherein the first text data was generated by the client computing device from a first speech input associated with a user, and converted using a client text-to-speech/speech-to-text converter, i.e., speech recognition or speech recognition converter. The method continues by converting, by the server, the first text data to first audio data using a server text-to-speech/speech-to-text converter, i.e., speech recognition or speech recognition converter; and synthesizing, by the server, speech based on the first audio data.

Another aspect is directed to a method that includes receiving, by a client computing device, a first speech input associated with a user; and converting, by the client computing device, the first speech input into first text data using a client text-to-speech/speech-to-text converter. The method continues by sending, by the client computing device to a server, the first text data, for conversion to first audio data, using a server text-to-speech/speech-to-text converter, and synthesis into speech.

In other aspects, the method may be embodied in computer-readable instructions or executed by a data processing system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards eliminating the transmission of speech in the form of a digitized waveform from a client device to a remote computing device, e.g., a server. Rather, the speech is converted to text and sent as text data between the client and the remote server. The server then converts the text data back to a speech waveform. The same process may also be used in sending speech data from the remote server back to the client, namely, the speech is converted to text at the remote server and sent as text data to the client where it is converted to speech using the client's text-to-speech converter.

It is to be understood that the phraseology and terminology used herein are for the purpose of description and should not be regarded as limiting. Rather, the phrases and terms used herein are to be given their broadest interpretation and meaning. The use of including and comprising and variations thereof is meant to encompass the items listed thereafter and equivalents thereof as well as additional items and equivalents thereof. The use of the terms connected, coupled, and similar terms, is meant to include both direct and indirect connecting and coupling.

Computing Architecture

Figure 1:
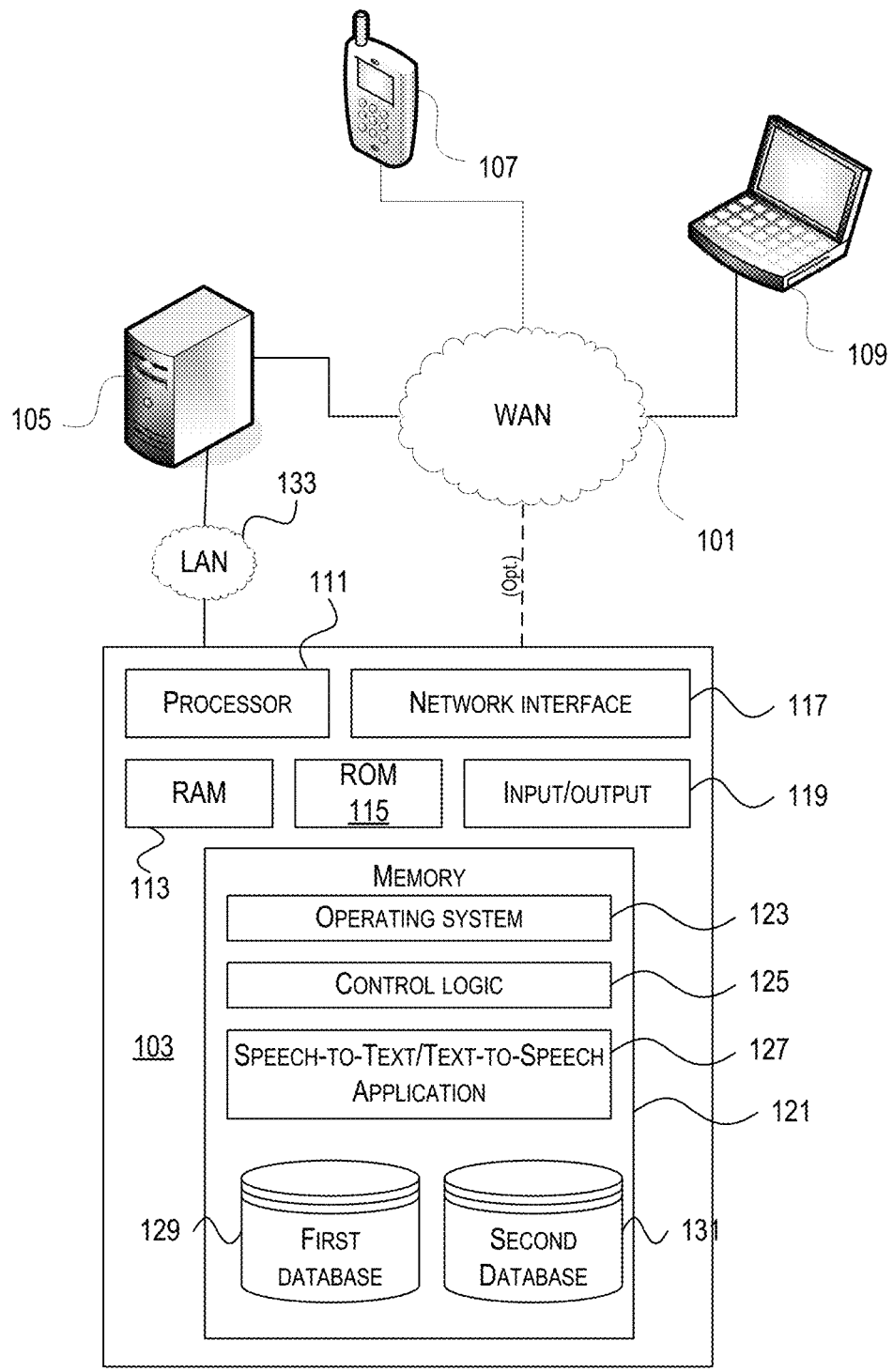
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term network as used herein and depicted in the drawings refers not only to systems in which remote storage devices are coupled together via one or more communication paths, but also to stand-alone devices that may be coupled, from time to time, to such systems that have storage capability. Consequently, the term network includes not only a physical network but also a content network, which is comprised of the data attributable to a single entity which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software, such as speech-to-text/Text-to-speech application 127 providing other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware, or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
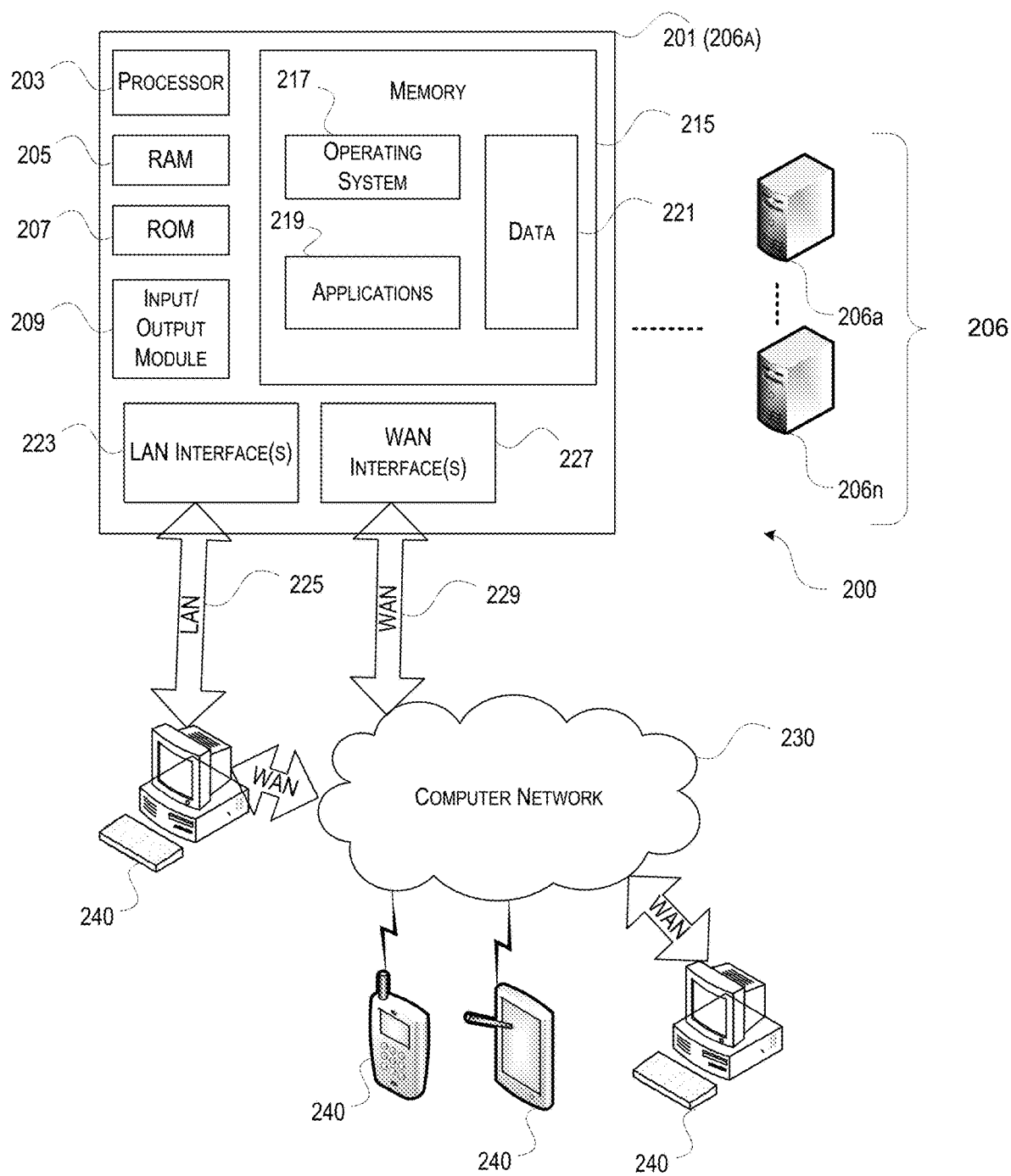
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, such as a Speech-to-Text/Text-to-Speech application, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as server(s) 206). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window, or in the case of audio output, where such audio would be output via a speaker or audio output jack. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
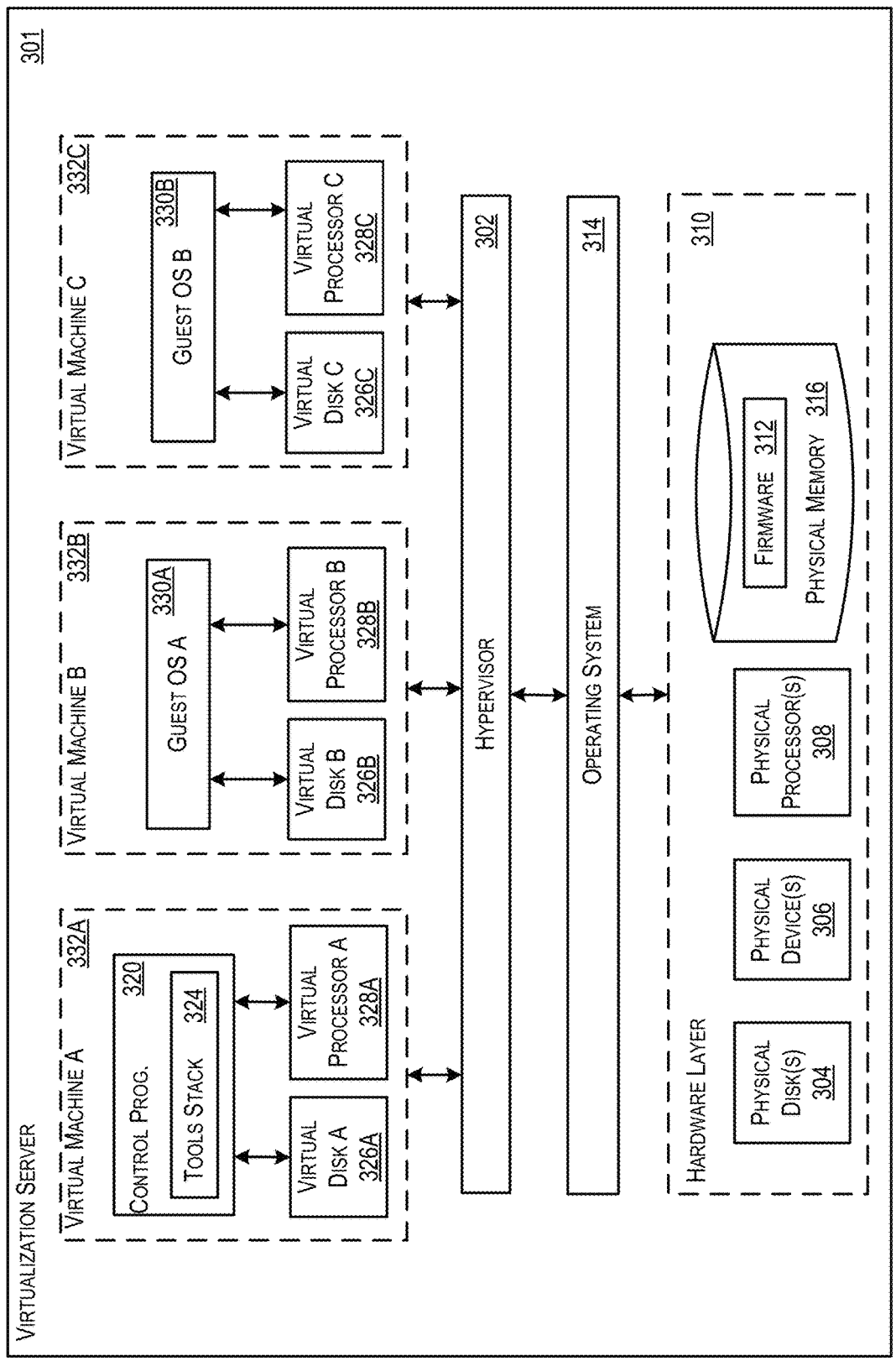
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, Virtual Server or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
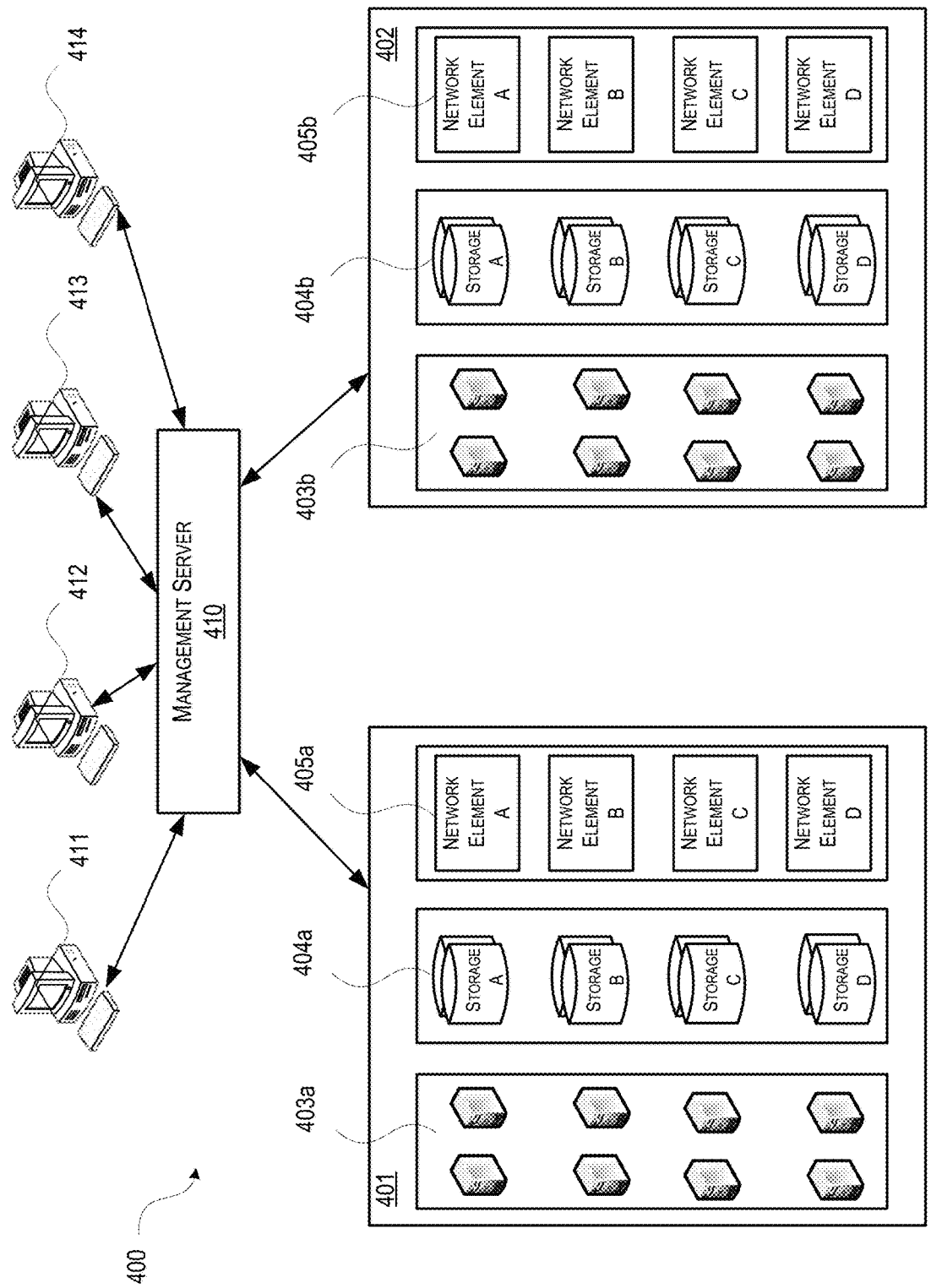
FIG. 4 depicts an illustrative cloud-based system architecture that may be used for automated application launching and in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as host servers 403), storage resources 404a-404b (generally referred herein as storage resources 404), and network elements 405a-405b (generally referred herein as network resources 405)) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
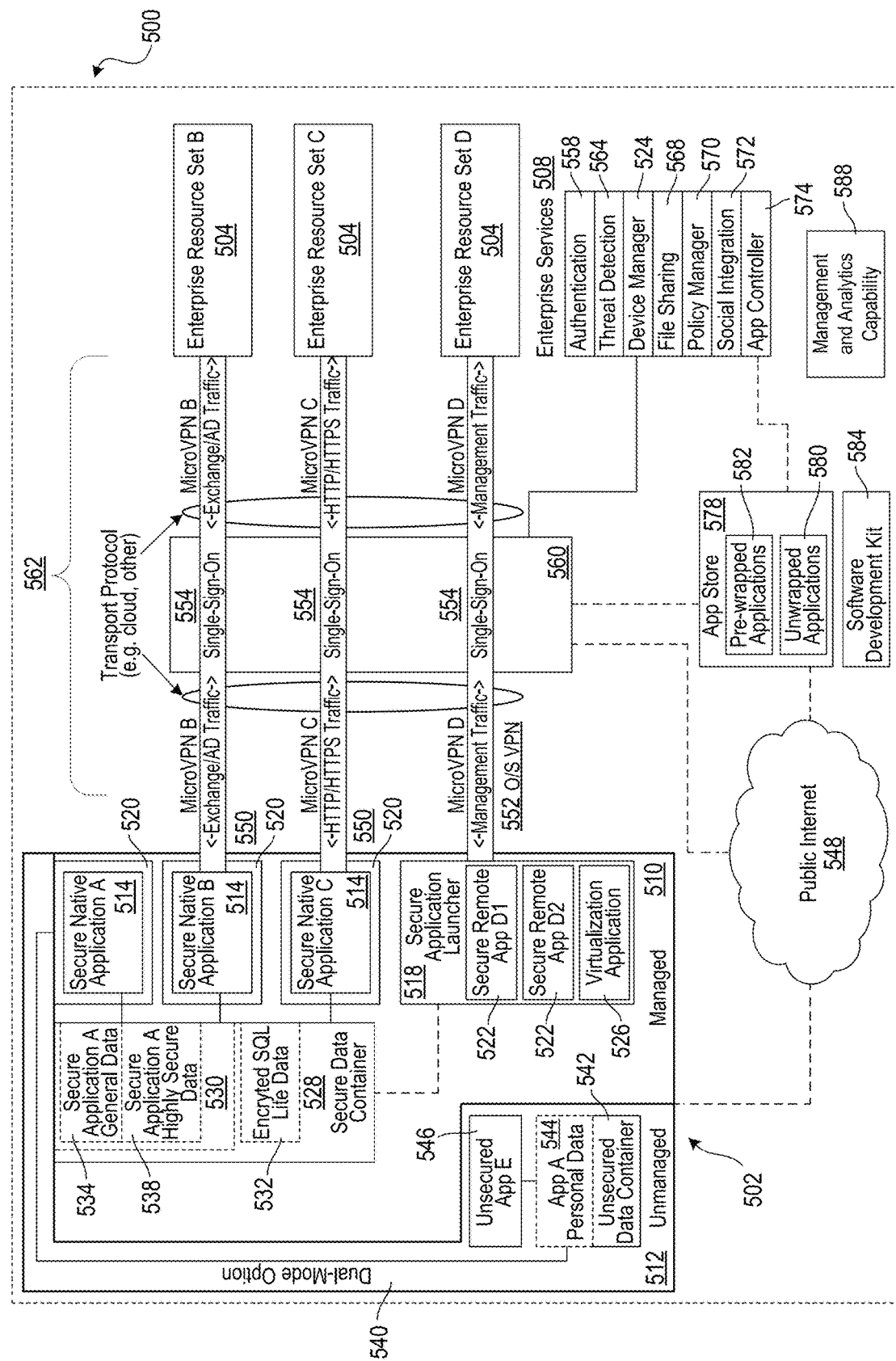
FIG. 5 depicts an illustrative enterprise mobility management system.

FIG. 5 represents an enterprise mobility technical architecture 500 for use in a Bring Your Own Device (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to mobilize some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed, or controlled by the enterprise (enterprise data) while leaving or otherwise preserving personal data, files, and/or applications owned, licensed, or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
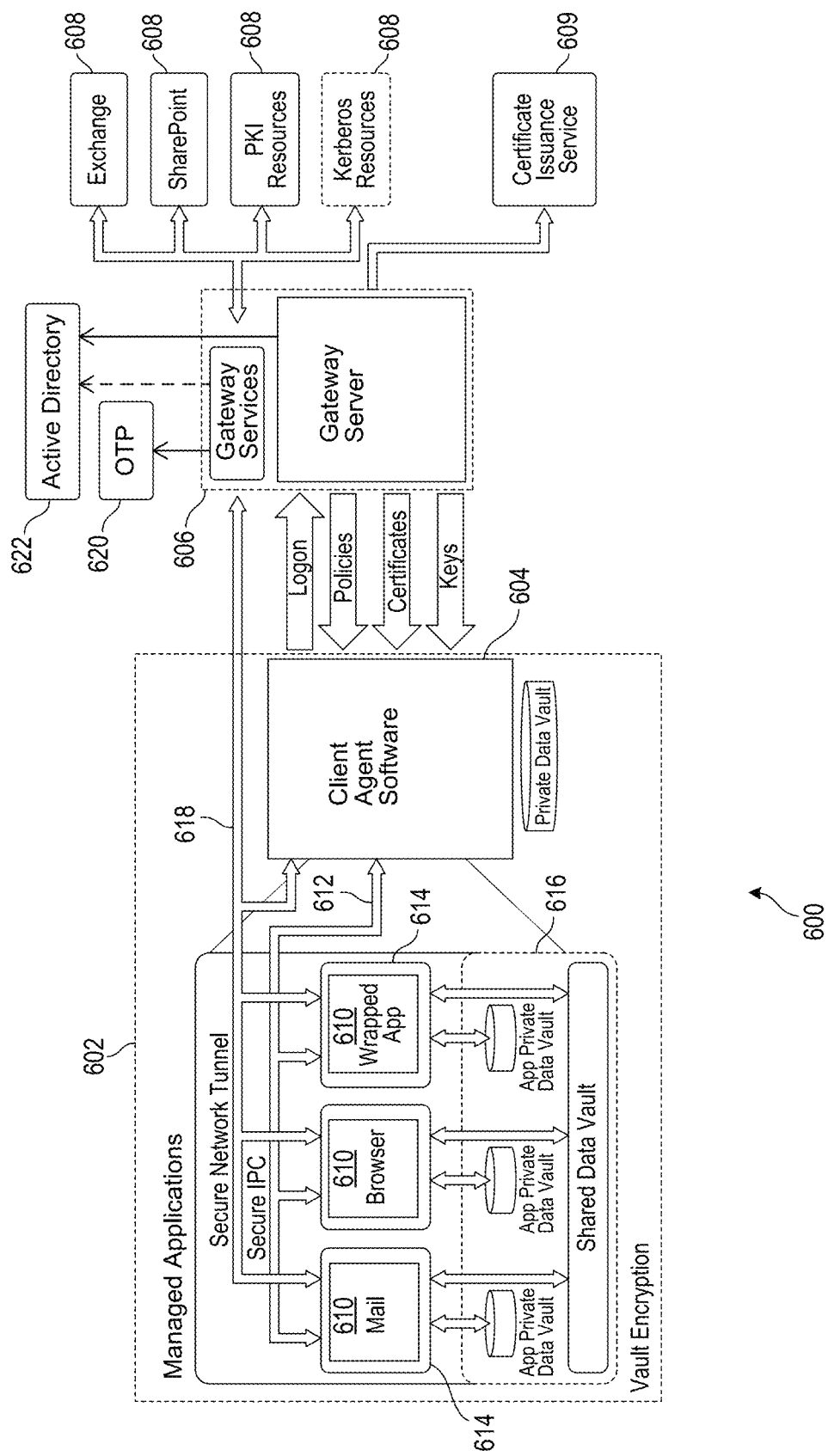
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 wrapping each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 wraps each managed application 610. This may be incorporated via an explicit build step, or via a post-build processing step. The application management framework 614 may pair with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in online-only data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for who am I, if or when an application uses the certificate to build a secure session token, and if or when an application uses private keys for digital signing of important data (e.g. transaction log) or for temporary data encryption.

Figure 7:
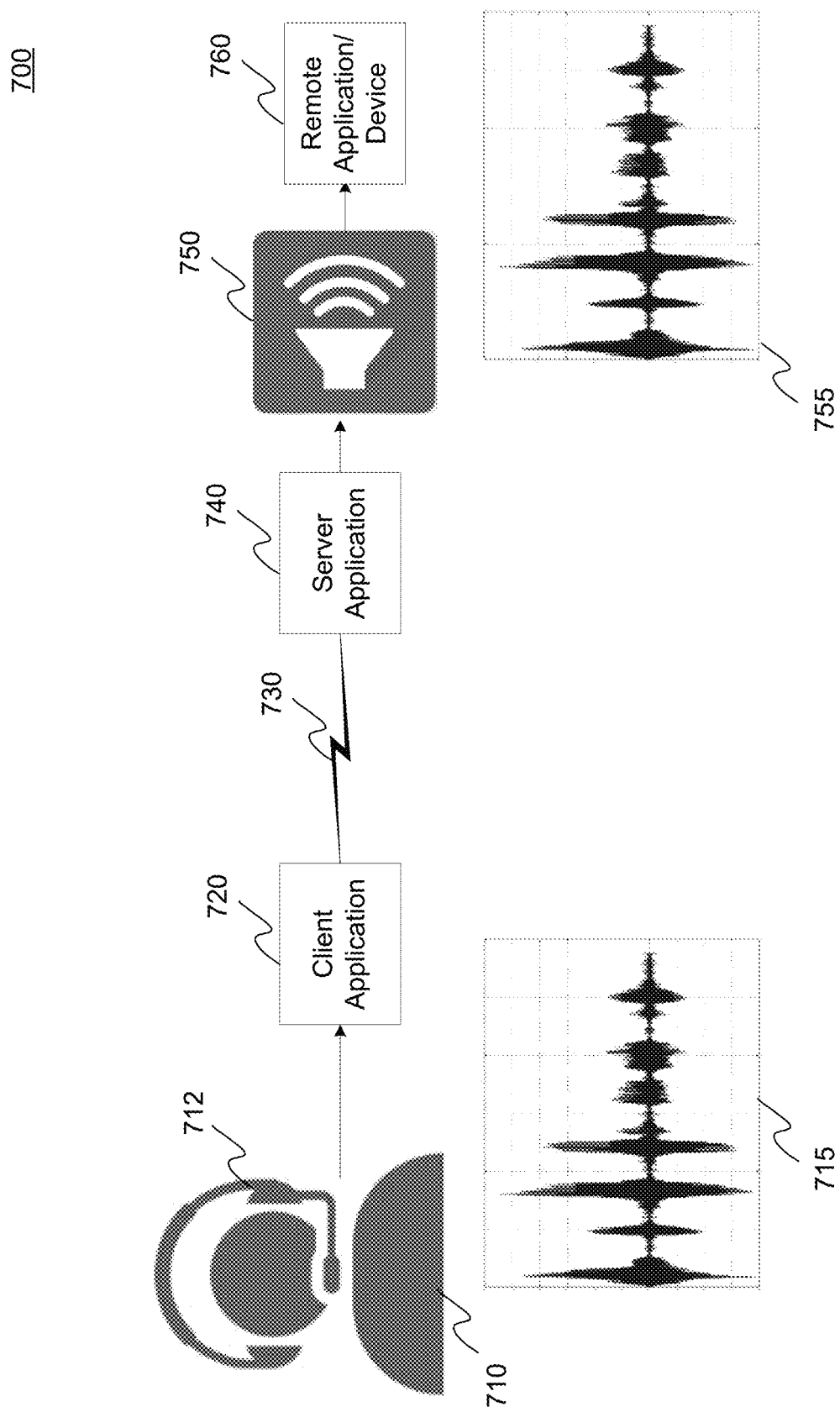
FIG. 7 depicts an illustrative client/server application environment using speech processing at the remote server in accordance with one or more illustrative aspects described herein.

FIG. 7 illustrates a client/server application system 700, according to an embodiment. Client/server application system 700 includes a user 710, a speech input 715, a client application 720, a communication link 730, a server application 740, an audio output device 750, an audio signal 755 and a remote application/device 760. User 710 is also shown with a microphone 712, such as a Universal Serial Bus (USB) or Bluetooth microphone to capture speech from user 710. A USB or Bluetooth microphone is shown for illustration only, but could be any type of microphone and audio processing system. The microphone, or other audio processing components, captures audio and/or speech input 715, digitize the speech and deliver the speech data to client application 720.

A microphone and audio processing system, or a USB or Bluetooth microphone, converts an analog audio signal to digital audio. Conversion of an audio waveform involves the capture of a large number of samples where the speed and depth at which the samples are captured determines the quality of a digital recording. Thus, conversion of analog to digital audio involves at least three factors, which include a sampling rate, bit depth and latency.

The speed, also referred to as a sample rate, is a determining factor in the quality of a recording. A typical music compact disc (CD) uses a sample rate of at least 44.1 kHz. However, professional recordings can use sample rates as high as 96 kHz or 192 kHz. The higher the sampling rate, the higher the quality of the recording, but the higher the sampling rate also increases the size of the recording file. And, if the files size increases, then the bandwidth required to transmit the file using communication link 730 also increases.

The bit depth of a digital recording refers to how many bits of information a sample contains. The bit depth determines a recording's resolution or detail. Typically, an audio CD will have a 16-bit depth, but some audio applications require a 24-bit depth. As with increased sample rates, a larger bit depth also increases the size of the recording file and the associated bandwidth required to transmit it from the client to the remote server.

Latency refers to the delay between the time a sound reaches the microphone and the time it takes for the signal to be converted into a digital signal. The USB or Bluetooth microphone, or a microphone with an audio processing system, will incur latency in its processing of an analog audio signal into a digital audio stream. The amount of latency introduced in the converting of an audio signal into a digital signal is dependent upon the processing speed and power of the circuitry being used as well as the sampling rate and bit depth of the conversion. The higher the sampling rate and the larger the bit depth, the larger the digital signal, with a corresponding increase in latency to process the increased data Further, latency is introduced in the transmission and subsequent decoding of the digital audio file back into speech. The transmission of data, e.g., via the internet, is subject to the quality of the internet connection, internet congestion, packet loss, all of which can introduce additional latency. Further, USB microphones tend to utilize a lossy USB speech encoder whereby any latency can result is distortion and the inability to reconstruct a lossless audio file.

One example embodiment of client/server application system 700 is that of user 710 at home wanting to access a virtual assistant located at a remote virtual machine, such as discussed regarding FIGS. 3-6. The virtual assistant is voice driven, therefore, user 710 speaks into microphone 712. Microphone 712 is connected into a personal computer, or any type of mobile electronic device (not shown) that is running client application 720. Microphone 712, with client application 720, performs a conversion of user 710's analog speech into digital audio as described above and forwards the digitized audio through communication link 730, e.g., the internet, to a remote machine running server application 740. Server application 740 receives the digitized audio file, decodes the digital audio to produce the recorded user 710's speech, depicted as audio signal 755, with audio output device 750. At this point, remote application/device 760, the virtual assistant in this example, would include a speech recognition function that would decode the speech and respond accordingly.

There are a number of issues with the above process. For example, as discussed above with sampling rates and bit-depths, the bandwidth required to transmit speech is fairly high. For example, with a sampling rate of 96 kHz, a 24-bit depth, a single channel of audio will require over 1 GB of data per hour. Further, given the large amount of data being transmitted over communication link 530, latencies associated with the processing and transmission of data can introduce noticeable delays and possible distortion due to lost or late packets in the speech stream. Therefore, the reconstituted speech may include distorted audio where the virtual assistant may not be successful in recognizing verbal commands.

Figure 8:
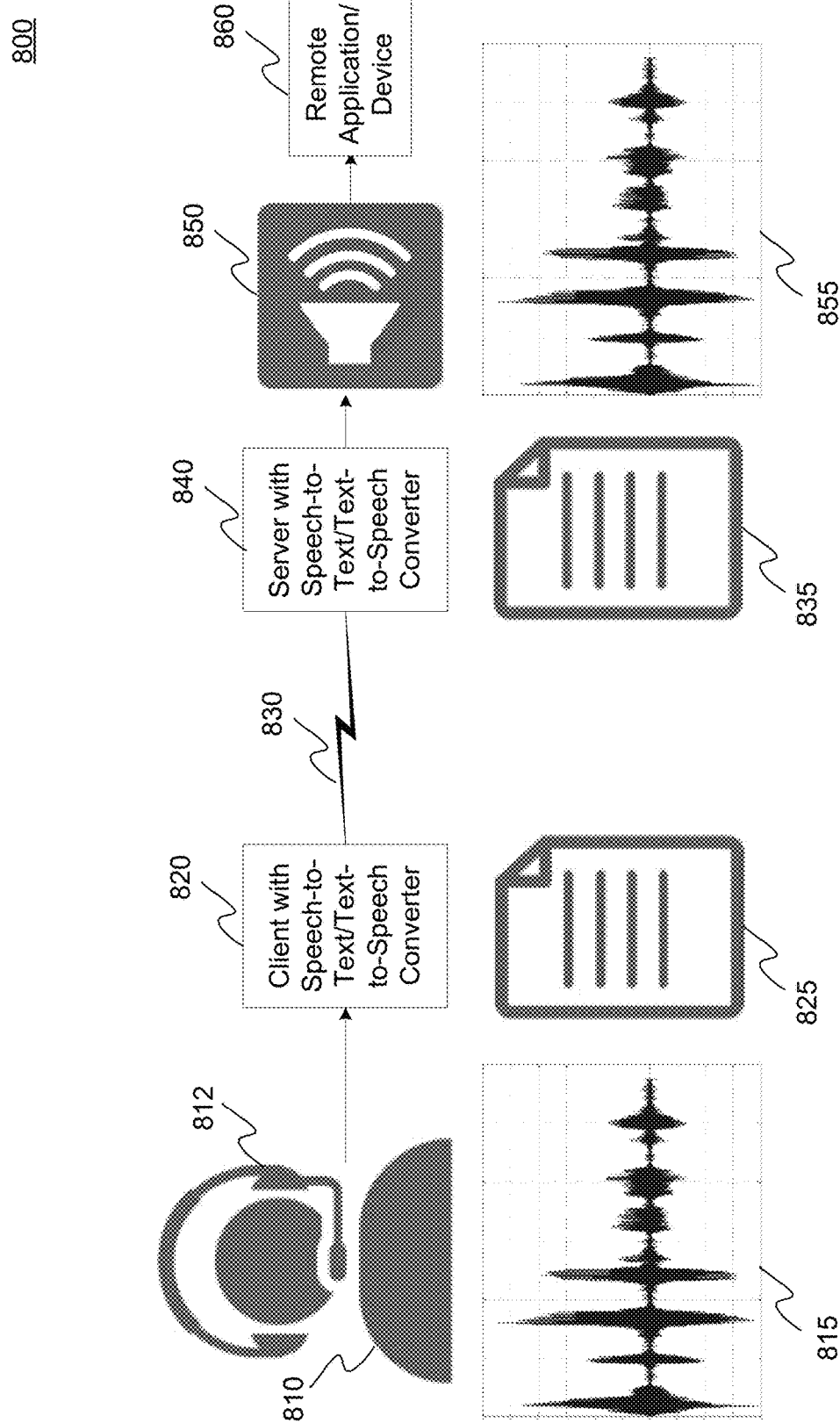
FIG. 8 depicts an illustrative client/server application environment using speech-to-text and text-to-speech processing at the client device and at a remote server in accordance with one or more illustrative aspects described herein.

FIG. 8 illustrates a client/server application system 800 using speech-to-text and text-to-speech conversion, according to an embodiment. Client/server application system 800 includes a user 810, a microphone 812, a user's speech pattern 815, a client system 820 with speech-to-text/text-to-speech conversion, e.g., a client agent application or a client speech recognition application, a text output 825, a communications link 830, a received text 835, a remote server 840 with speech-to-text/text-to-speech conversion, an audio output device 850, speech signal 855, and a remote application/device 860.

Similar to the example of FIG. 7, here user 810, through a remote virtual machine as described in FIGS. 3 and 4, wishes to access a virtual assistant, e.g., remote application/device 860, the process includes the use of speech-to-text/text-to-speech converters at both the client device and at the remote server dramatically reduce the bandwidth requirements of communications link 830 and also any latency induced distortion. As any speech input is converted to text prior to transmission over communications link 830, there is no distortion to the speech data introduced during transmission over communications link 830. Also, since text, rather than audio is being transmitted, the required bandwidth necessary over communication link 830 is greatly reduced as will be shown below.

Client/server application system 800 illustrates where user 810 speaks into microphone 812. Microphone 812 is connected into a client system 820, such as a personal computer, or any type of mobile electronic device (not shown) that is running a client application. Microphone 812 converts user 810's analog speech input into a digital stream that is directed to the local client system 820. Alternately, microphone 812 could produce an analog signal that is then converted to a digital stream by dedicated circuitry or through a local personal computer. Client system 820 includes speech-to-text/text-to-speech conversion capabilities. Such speech-to-text/text-to-speech conversion capabilities could utilize a variety of speech recognition technologies including, for example, acoustic modeling, natural language processing, deep learning neural networks, etc. In either case, user 810's speech is converted into a text stream or text output 825 that is then transmitted through communications link 830 to remote server 840 with speech-to-text/text-to-speech conversion. Remote server 840 can then convert the received text stream or received text 835 into speech output using its speech-to-text/text-to-speech conversion capabilities, and then through audio output device 850 shown as speech signal 855. The articulated speech can then be directed to remote application/device 860, e.g., a remote virtual assistant.

In an embodiment, client system 820 could be configured to display to user 810, while user 810 is talking, the results of client system 820 converting user 810's speech, as shown in speech pattern 815 being converted to text output 825. In another embodiment, user 810 could have the opportunity to edit the text output 825 prior to sending it to remote server 840.

Since the input to remote server 840 is text there is no latency induced distortion as was present with the transmitted speech. As text is being transmitted over communication link 830, any associated latency incurred, e.g., because of network congestion or packet loss, will have no effect on the subsequent conversion of the transmitted text into speech as the transmitted text data is not changed or distorted. In addition, the bandwidth used to transmit a text file is substantially less. For example, it was estimated that a speech audio file produces more than 1 GB per hour. Given that the average person speak about 125-150 words per minute, that would result in approximately 7,500 9000 words per hour. If it is assumed that there is an average of 6 characters per word, an hour of speech would generate a text file of 45,000-54,000 characters, or roughly 50 k characters. Given that an ASCII character is usually 8-bits, the resulting text file would be 400 kb or 50 KB versus the 1 GB for audio, approximately a 20,000 times reduction in bandwidth. While these figures are approximate, they do indicate the order of magnitude reduction in required bandwidth.

Figure 9:
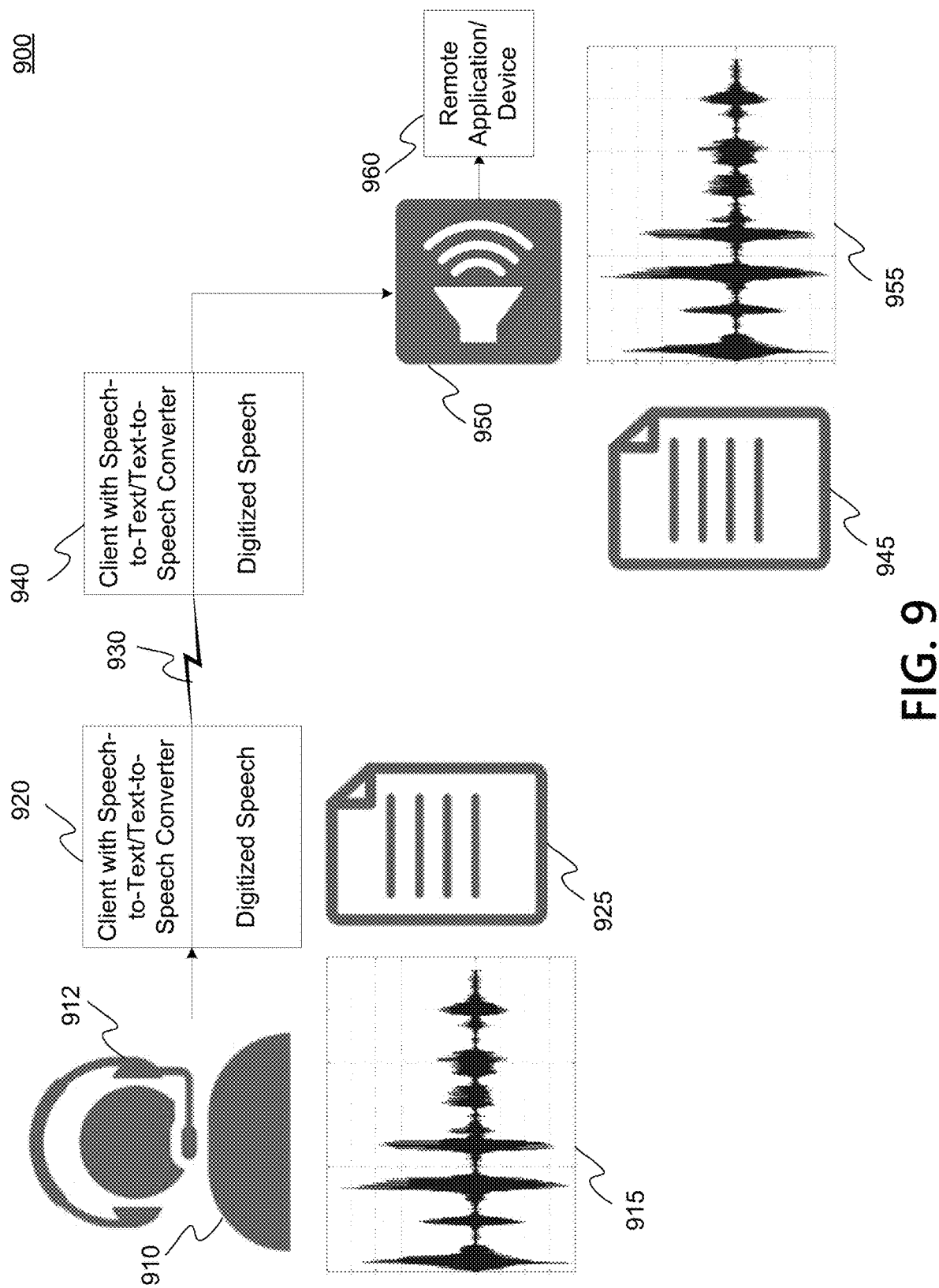
FIG. 9 depicts an illustrative client/server application environment using speech-to-text and text-to-speech processing at a client device and a remote server with a remote application device in accordance with one or more illustrative aspects described herein.

FIG. 9 illustrates a client/server application system 900 using speech-to-text and text-to-speech conversion, according to an embodiment. This embodiment illustrates a hybrid system that monitors network conditions where if the latency exceeds a threshold then the client device utilizes a client based speech-to-text/text-to-speech conversion to convert speech to text that is then transmitted to a remote server. Client/server application system 900 includes a user 910, a microphone 912, a user's speech pattern 915, a client system 920, a text output 925, a communications link 930, a remote server 940, a received text 945, an audio output device 950, output speech 955, and a remote application/device 960.

Client/server application system 900 illustrates where user 910 speaks into microphone 912. Microphone 912 is connected into a client system 920, such as a personal computer, or any type of mobile electronic device (not shown) that is running a client application. Microphone 912 converts user 910's analog speech input into a digital stream, also referred to as digitized speech, as discussed above by sampling the speech at a particular bit depth.

Either client system 920 or remote server 940 can determine a network latency between each other. For example, client system 920 can execute a network ping command that sends an Internet Control Message Protocol (ICMP) Echo Request messages to the destination computer, e.g., remote server 940, and waits for a response. How many of those responses are returned, and how long it takes for them to return, are the two major pieces of information that the ping command provides. If the results of the ping command, or any other command or form of measuring network latency, is below a predetermined value, then client/server application system 900 will send the user's digitized speech to remote server 940 utilizing communication link 930. Upon receiving the user's digitized speech, remote server 940 will decode the digitized speech to produce the recorded user 710's speech, depicted as audio signal 955, with audio output device 950. At this point, remote application/device 770, the virtual assistant in this example, would include a speech recognition function that would decode the speech and respond accordingly.

However, if the results of the ping command, or any other command or form of measuring network latency, is above a predetermined value, indicating that network communications between client device 920 and remote server 940 have a greater than acceptable latency, then client/server application system 900 may convert user 910's speech into a text stream or text output 925 that is then transmitted through communications link 930 to remote server 940. Remote server 940 can then convert the received text stream or received text 935 into speech output using speech-to-text/text-to-speech conversion, and then through audio output device 950 shown as speech signal 955. The articulated speech can then be directed to remote application/device 960, e.g., a remote virtual assistant.

Figure 10:
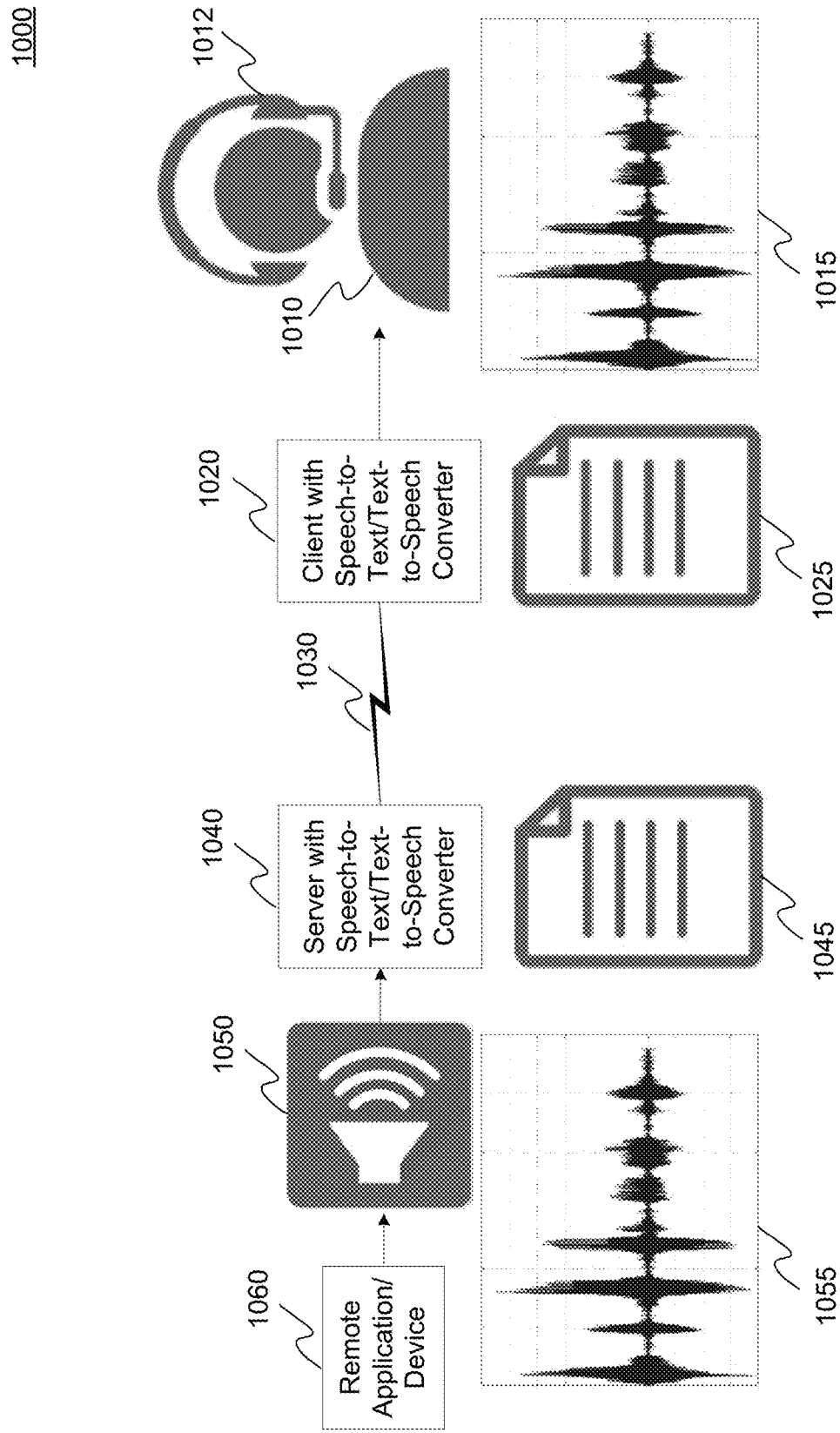
FIG. 10 depicts an illustrative client/server application environment using speech-to-text and text-to-speech processing at the client device and a remote server in accordance with one or more illustrative aspects described herein.

FIG. 10 illustrates a client/server application system 1000 using speech-to-text and text-to-speech conversion, according to an embodiment. This embodiment illustrates the generation of speech by a computing device, such as a virtual assistant that is directed to a user. In one scenario the speech generated by the computing device is in response to a user's speech or command, e.g., an initial question to a virtual assistance. Client/server application system 1000 includes a user 1010, a microphone 1012, a speech pattern 1015, a client system 1020 with speech-to-text/text-to-speech conversion, a text output 1025, a communications link 1030, a remote server 1040 with speech-to-text/text-to-speech conversion, a text file 1045, an audio output device 1050, output speech 1055, and a remote application/device 1060.

Client/server application system 1000 illustrates an initial generation of output speech 1055 by remote application/device 1060 that is played by audio output device 1050 and received by remote server 1040 that includes a speech-to-text/text-to-speech converter, which converts the speech originally generated by remote application/device 1060 into a text stream or text file 1045. Text file 1045 is sent via communication link 1030 to the local client system 1020 where the received text output 1025 is converted back to speech pattern 1015 by the speech-to-text/text-to-speech converter in client system 1020, which is then heard by user 1010. The scenario described in client/server application system 1000 could occur after a user, such as where user 710 speaks into microphone 712 with a question directed to a virtual assistant, e.g., remote application/device 760.

Figure 11:
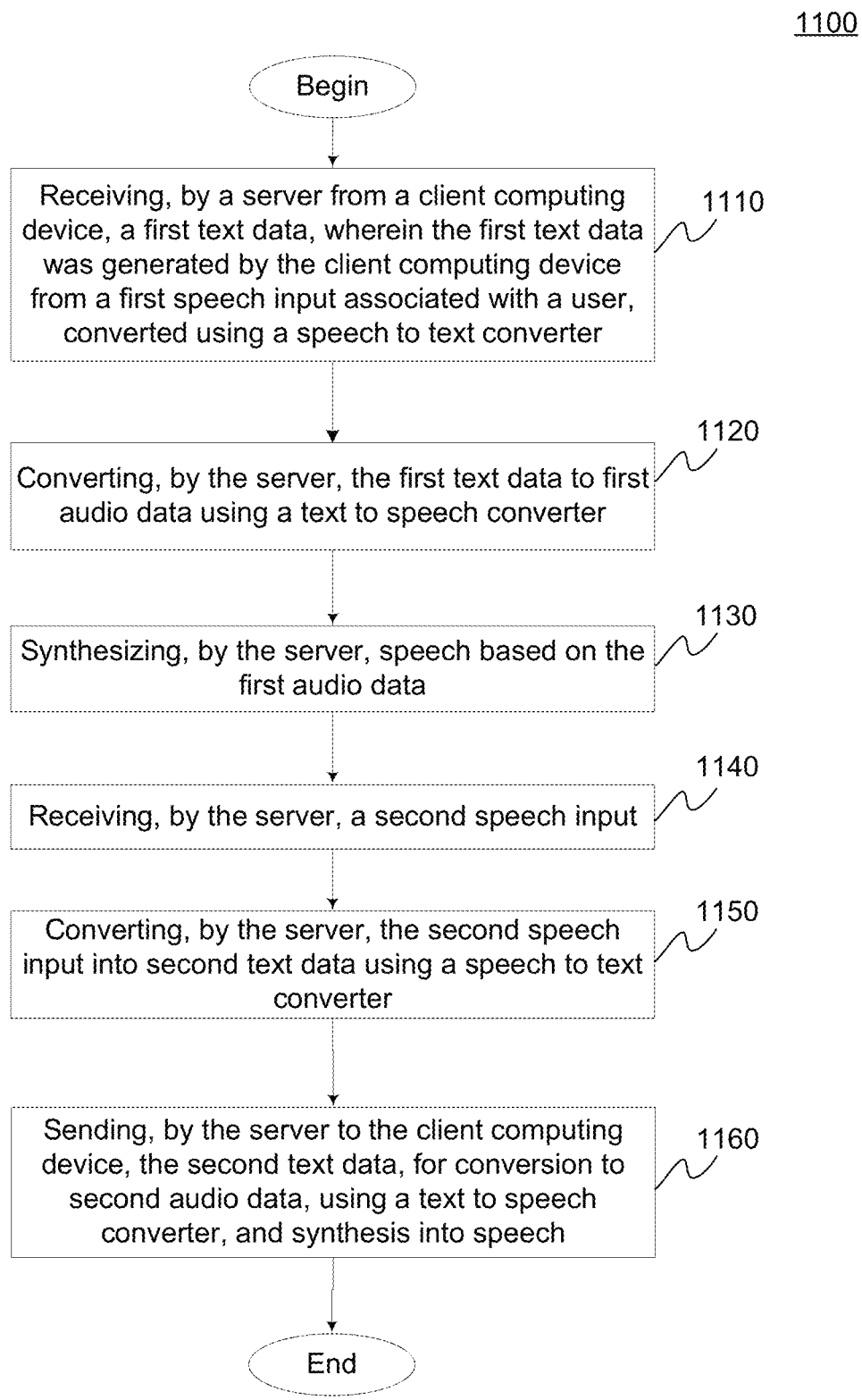
FIG. 11 depicts an illustrative flowchart of a client/server application environment using speech-to-text and text-to-speech processing originating at the client device based on human speech in accordance with one or more illustrative aspects described herein.

FIG. 11 depicts a flow diagram that illustrates a method 1100 in which redirected speech in the form of text is used in a networked based environment from the perspective of a remote server. Steps 1110-1130 are directed towards communications initiated at the client device. Steps 1140-1160 are initiated at the remote server and are directed back to the client device. In some embodiments only steps 1110-930 or steps 1140-1160 are applicable. In other embodiments, steps 1140-1160 are performed in response to steps 1110-1130.

At 1110 a remote server, such as remote server 840 with speech-to-text/text-to-speech conversion, receives from a client computing device, such as client system 820 with speech-to-text/text-to-speech conversion, text data. The text data can consist of a stream of text or a text file. The text data was generated by the client computing device, such as client system 820, from speech from a user using speech-to-text/text-to-speech conversion in client system 820.

At 1120, the server, such as remote server 740 or 1040, converts the received first text data to audio data using a text to speech converter, such as the speech-to-text/text-to-speech converter in remote server 740. At 1130, the server, such as remote server 740, generates speech from the received first text data. Such speech is also referred to as synthesized speech or machine generated speech. Further the generated speech can be output using an output device, such as audio output device 750.

At 1140, the server, such as remote server 740 or 1040, receives a second speech input. The second speech input could be speech generated by a remote application or device, virtual assistant, etc., such as remote application/device 1060 that outputs speech to remote server 1040 with speech-to-text/text-to-speech conversion capabilities. At 1150, the server, such as remote server 740, converts the second speech input into second text data using a speech to text converter. Such a conversion could be done by remote server 1040 that includes a speech-to-text/text-to-speech converter, which converts the speech originally generated by remote application/device 1060 into a test stream or text file 1045.

At 1160, the server, such as remote server 840 or 1040, sends the second text data to the client computing device for conversion to second audio data using a text-to-speech converter and then synthesizing, i.e., generating speech using a computing device, also referred to as machine generated or synthesized speech, the audio data into speech. For example, as shown as in FIG. 9 where text file 945 is sent via communication link 930 to the local client system 920 where the received text output 925 is converted back to speech pattern 915 by the speech-to-text/text-to-speech converter in client system 920, which is then heard by user 910.

Further, the client computing device could generate a confirmation of the receipt of the second text data back to the server so that the server has acknowledgement that the data was properly received. Method 1100 then ends.

Figure 12:
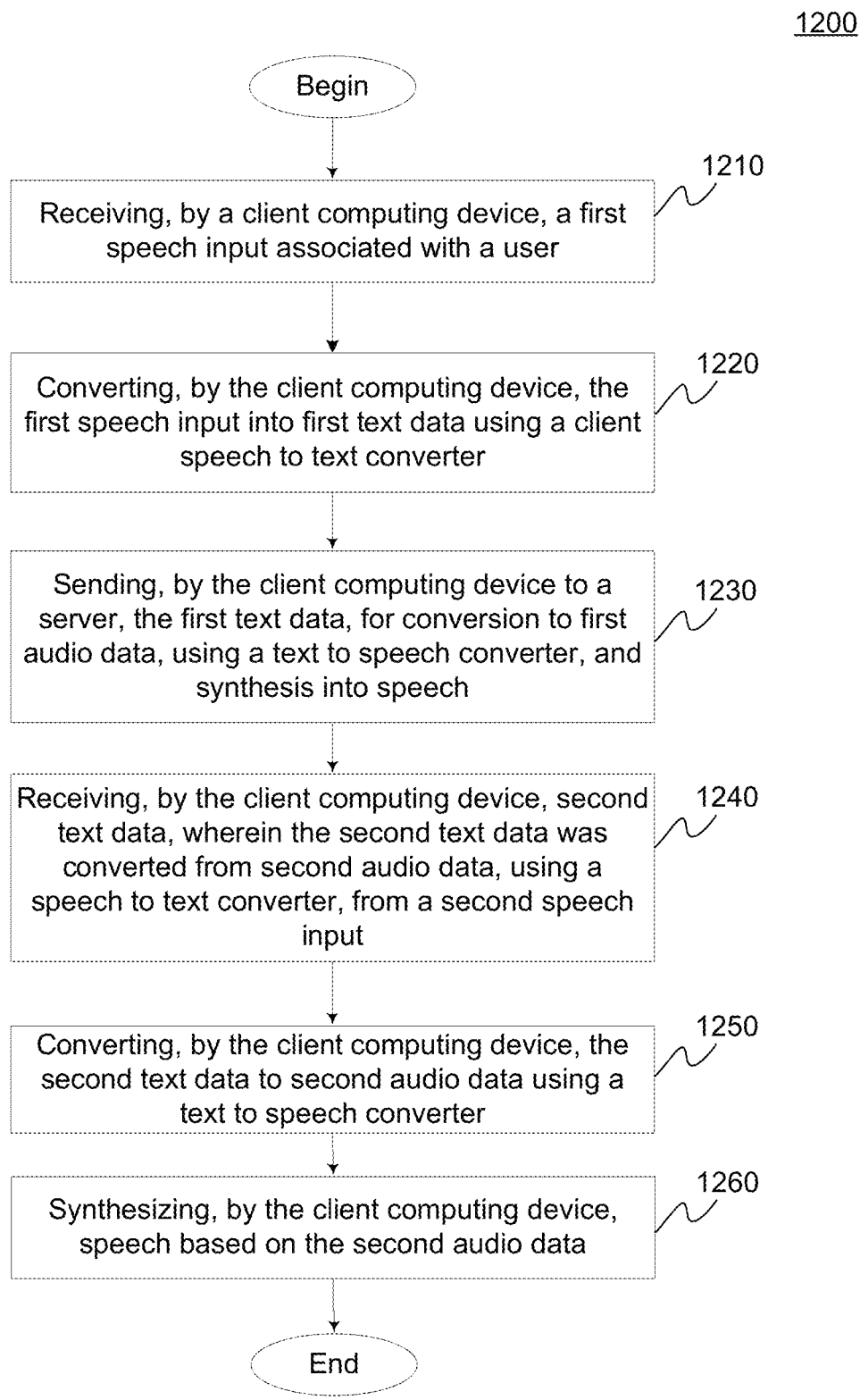
FIG. 12 depicts an illustrative flowchart of a client/server application environment using speech-to-text and text-to-speech processing originating at a remote server based on synthesized speech in accordance with one or more illustrative aspects described herein.

FIG. 12 depicts a flow diagram that illustrates a method 1200 in which redirected speech in the form of text is used in a network based environment from the perspective of a client device. Steps 1210-1230 are directed towards communications initiated at the client device. Steps 1240-1260 are initiated at the remote server and are directed back to the client device. In some embodiments only steps 1210-1230 or steps 1240-1260 are applicable. In other embodiments, steps 1240-1260 are performed in response to steps 1210-1230.

At 1210 a client computing device, such as client system 820, with speech-to-text/text-to-speech conversion capability, receives a first speech input associated with a user. For example, in client/server application system 800, where user 810 speaks into microphone 812 and microphone 812 is connected into a client system 820, such as a personal computer, or any type of mobile electronic device (not shown) that is running a client application. Microphone 812 converts user 810's analog speech input into a digital stream that is directed to the local client system 820, which includes speech-to-text/text-to-speech conversion capabilities.

At 1220, the client computing device converts the first speech input into first text data using a client system based speech to text converter. For example, as discussed in FIG. 8, microphone 812 converts user 810's analog speech input into a digital stream that is directed to the local client system 820 that includes speech-to-text/text-to-speech conversion capabilities. User 810's speech can then be converted into a text stream or text output 825 that is then transmitted through communications link 830 to remote server 840 with speech-to-text/text-to-speech conversion. Remote server 840 can then convert the received text stream or received text 835 into speech output using its speech-to-text/text-to-speech conversion capabilities, and then through audio output device 850 where the articulated speech can then be directed to remote application/device 860, e.g., a remote virtual assistant. In another embodiment, as discussed in FIG. 9, the client/server system 900 can monitor the communication link 930 through the use of monitoring software or devices, such as a ping command to measure the round trip travel time of a packet between client system 920 and remote server 940. If the round trip travel time, or any other measure of network speed, indicates a time below a predetermined value then client/server application system 900 can send the user's digitized speech to remote server 940 utilizing communication link 930. Upon receiving the user's digitized speech, remote server 940 can decode the digitized speech to produce the recorded user 710's speech, depicted as audio signal 955, with audio output device 950.

However, if the results of the ping command, or any other command or form of measuring network latency, is above a predetermined value, indicating that network communications between client device 920 and remote server 940 have a greater than acceptable latency, then client/server application system 900 may convert user 910's speech into a text stream or text output 925 that is then transmitted through communications link 930 to remote server 940. Remote server 940 can then convert the received text stream or received text 935 into speech output using speech-to-text/text-to-speech conversion, and then through audio output device 950 shown as speech signal 955. The articulated speech can then be directed to remote application/device 960, e.g., a remote virtual assistant.

At 1230 the client computing device sends the first text data of a server where the server can convert the text data to audio data using a server based text to speech converter, which can then be synthesized into speech. For example, where text stream or text output 825 is transmitted through communications link 830 to remote server 840 with speech-to-text/text-to-speech conversion. Remote server 740 can then convert the received text stream or received text 835 into speech output through audio output device 850 shown as speech signal 855. The articulated speech can then be directed to remote application/device 860, e.g., a remote virtual assistant.

At 1240, the client computing device receives a second set of text data, which was generated from a second audio data, using a speech to text converter, from a second speech input. For example, where client/server application system 1000 illustrates an initial generation of output speech 1055 by remote application/device 1060 that is played by audio output device 1050 and received by remote server 1040 that includes a speech-to-text/text-to-speech converter that converts the speech originally generated by remote application/device 1060 into a test stream or text file 1045. Text file 1045 is sent via communication link 1030 to the local client system 1020.

At 1250, the client computing device converts the second text data to a second audio data using a text to speech converter. And, at 1260, synthesizing, by the client computing device, speech based on the second audio data. For example, where the local client system 1020 receives text output 1025, which is converted back to speech pattern 1015 by the speech-to-text/text-to-speech converter in client system 1020, which is then heard by user 1010. Method 1200 then ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reducing transmission bandwidth for speech data, comprising:
   providing, by a server to a remote client device, via a connection between the server with an application on the remote client device, access to a speech-enabled application executable on the server;
   detecting, by the server, that a network condition, associated with the connection, satisfies a threshold;
   determining, based on the detecting, to transmit, via the connection, text data instead of audio data;
   receiving, by the server, first text data from the application on the remote client device, wherein the first text data is representative of an audio input received by the remote client device and being identified as an input for the speech-enabled application;
   converting, by the server, the received first text data back to the audio input; and
   providing, by the server, the converted audio input to the speech-enabled application, to prevent one or more errors in an audio input of the speech-enabled application caused by use of audio files that have been distorted due to transmission of the audio files from the remote client device to the speech-enabled application.

2. The method of claim 1, further comprising:
   receiving, by the server, a machine generated speech from the speech-enabled application;

converting, by the server, the machine generated speech into second text data; and sending, by the server to the remote client device via the application, the second text data.

3. The method of claim 2, wherein the machine generated speech received by the server is in response to the converted audio input provided by the server to the speech-enabled application.

4. The method of claim 1, wherein the speech-enabled application comprises a virtual assistant configured to accept the converted audio input.

5. The method of claim 1, wherein the speech-enabled application comprises a word processing program configured to accept the converted audio input.

6. The method of claim 1, wherein the detecting that the network condition satisfies a threshold comprises detecting a latency value, associated with the connection, exceeds a second threshold.

7. The method of claim 1, wherein the server comprises a virtualization server.

8. The method of claim 1, further comprising receiving user input to modify the first text data prior to being converted.

9. The method of claim 1, wherein the application executing on the remote client device facilitates establishing a connection between the server and the remote client device.

10. A method comprising:
receiving, by a client computing device, a speech input associated with a user;

detecting that a network condition, associated with a connection between a remote server and the client computing device, satisfies a threshold, wherein access to a speech-enabled application executable on the server is provided to the client computing device via the connection;

converting, by an application on the client computing device and based on the detecting, the speech input into text data; and sending, by the application executing on the client computing device, the text data to the speech-enabled application via the connection, to prevent errors in an audio input to the speech-enabled application caused by use of audio files that have been distorted due to transmission of the audio from the client computing device to the speech-enabled application.

11. The method of claim 10, further comprising:
receiving, by the application executing on the client computing device, second text data from the remote server;

converting, by the application executing on the client computing device, the second text data to second speech; and outputting, by the application executing on the client computing device, the second speech as a response to the speech input.

12. The method of claim 11, further comprising receiving, by the user, the second speech.

13. The method of claim 10, wherein the detecting that the network condition satisfies a threshold comprises detecting a latency value, associated with the connection, satisfies a second threshold.

14. The method of claim 10, wherein the remote server comprises a remote virtualization server.

15. The method of claim 10, further comprising accepting input from the user to modify the text data prior to the sending, by the application executing on the client computing device, the text data.

16. The method of claim 10, wherein the receiving the speech input comprises receiving the speech input through a lossy speech encoder.

17. The method of claim 10, wherein the application on the client computing device facilitates establishing a connection between the remote server and the client computing device.

18. A server device, comprising:
a processor; and memory storing computer-readable instructions that, when executed by the processor, cause the server device to;

provide, via a connection between the server with an application on a remote client device, access to a speech-enabled application executable on the server;

detect that a network condition, associated with the connection, satisfies a threshold;

determine, based on the detecting, to transmit, via the connection, text data instead of audio data;

receive, first text data from the application executing on the remote client device, wherein the first text data is representative of an audio input received by the remote client device and being identified as an input for the speech-enabled application;

convert the received first text data back to an audio input; and provide the converted audio input to the speech-enabled application, to prevent errors in an audio output of the speech-enabled application caused by use of audio files that have been distorted due to transmission of the audio files from the remote client device to the speech-enabled application.

19. The server device of claim 18, wherein the speech-enabled application comprises a virtual assistant configured to receive the converted audio and perform an action.

20. The server device of claim 18, wherein the memory stores additional computer-readable instructions that, when executed by the processor, cause the server device to:
receive a machine generated speech from the speech-enabled application;

convert the machine generated speech into second text data; and send, to the remote client device via the application, the second text data.

* * * * *